United States Patent
Vermette et al.

(10) Patent No.: US 7,621,493 B2
(45) Date of Patent: Nov. 24, 2009

(54) SUPPORT FOR MOUNTING A BICYCLE RACK ON A FRAME

(76) Inventors: Laurier J. Vermette, 1194 Oak Avenue, Windsor, Ontario (CA) N9A 5G6; Ronald J. Shpak, 411 Wellington Avenue, Windsor, Ontario (CA) N9A 5J3; Deborah J. Shpak, 411 Wellington Avenue, Windsor, Ontario (CA) N9A 5J3; Linda M. Vermette, 1194 Oak Avenue, Windsor, Ontario (CA) N9A 5G6

( * ) Notice: Subject to any disclaimer, the term of this patent is extended or adjusted under 35 U.S.C. 154(b) by 546 days.

(21) Appl. No.: 11/042,141

(22) Filed: Jan. 26, 2005

(65) Prior Publication Data
US 2006/0175369 A1 Aug. 10, 2006

(51) Int. Cl.
*B60R 9/06* (2006.01)
(52) U.S. Cl. .................. 248/200.1; 224/500; 280/415.1
(58) Field of Classification Search .............. 248/200.1, 248/354.1; 224/500, 519, 521, 488; 280/415.1, 280/416.1
See application file for complete search history.

(56) References Cited

U.S. PATENT DOCUMENTS

| | | | | |
|---|---|---|---|---|
| 2,512,267 | A | | 6/1950 | Donnelly |
| 2,832,559 | A | * | 4/1958 | Hillberg ..................... 254/100 |
| 3,131,902 | A | * | 5/1964 | Zak, Jr. ..................... 248/354.3 |
| 4,343,578 | A | * | 8/1982 | Barnes ........................ 410/151 |
| 4,737,056 | A | * | 4/1988 | Hunt ........................... 410/151 |
| 5,085,360 | A | | 2/1992 | Fortune et al. |
| 5,219,105 | A | * | 6/1993 | Kravitz ........................ 224/511 |
| 5,580,076 | A | * | 12/1996 | DeRoule et al. .......... 280/406.2 |
| 5,794,959 | A | | 8/1998 | Scheef, Jr. |
| 6,637,363 | B2 | * | 10/2003 | Schmitt et al. .............. 114/361 |
| 6,644,525 | B1 | | 11/2003 | Allen et al. |
| 6,695,184 | B2 | | 2/2004 | Higginbotham, III |
| 6,851,652 | B1 | * | 2/2005 | Huang ..................... 248/200.1 |
| 6,957,515 | B1 | * | 10/2005 | Hatfield ..................... 52/127.2 |
| 7,275,731 | B1 | * | 10/2007 | Shinault ..................... 249/216 |
| 2004/0035998 | A1 | | 2/2004 | McCoy et al. |
| 2004/0262247 | A1 | * | 12/2004 | Moon .......................... 211/74 |

(Continued)

OTHER PUBLICATIONS

Pro Rac Tongue Mounted Bike Rack product advertisement (Nov. 10, 2004).

(Continued)

*Primary Examiner*—Amy J Sterling
*Assistant Examiner*—Steven M Marsh
(74) *Attorney, Agent, or Firm*—Standley Law Group LLP (57) ABSTRACT

A support for mounting a bicycle rack on a frame, particularly an A-frame of a trailer tongue, has a cross-piece having a length to span spaced-apart frame elements of the frame. The cross-piece forms angles with the frame elements. Mounting brackets are secured to the cross-piece at an angle congruent to the angle formed between the cross-piece and the frame elements and are used to mount the support on the frame elements. A mounting means, for example a receiver tube, is secured to the cross-piece for mounting the bicycle rack to the cross-piece. The support is particularly useful for fender-less trailers having an A-frame tongue since the support can be mounted on the A-frame tongue between the trailer and the towing vehicle. Thus, bicycles can be conveniently carried between the trailer and the towing vehicle.

2 Claims, 10 Drawing Sheets

U.S. PATENT DOCUMENTS

2007/0012847 A1* 1/2007 Tai .............................. 248/343

OTHER PUBLICATIONS

Open Roads Forum, posting from jamess67 on Mar. 22, 2004.
Your Guide to Towing (Chapter 5, Trailer Hitches, pp. 31-36, Nov. 11, 2004).
DrawTite Hitch product advertisement on e-trailer.com (Nov. 10, 2004).
Bike Rack 101 (stlbiking website, Nov. 10, 2004).
Photos posted on r-visioningcamping.org website Aug. 13, 2004.
Photos posted by Linda and Laurier Vermette on r-visioningcamping.org website in early Jun. 2004.

* cited by examiner

SUPPORT FOR MOUNTING A BICYCLE RACK ON A FRAME

FIELD OF THE INVENTION

The present invention is related to supports adapted for mounting bicycle racks on frames, particularly A-frame tongues of trailers.

BACKGROUND OF THE INVENTION

Vacationers and other travelers who travel by motor vehicle often also like to take bicycles with them on their travels. This necessitates a means for carrying the bicycles in a manner secure enough that the rigors of road travel will not cause the bicycles to come loose and possibly fly off during travel.

For many vehicles, it is possible to mount a hitch to the vehicle in a normal manner and then mount a bicycle rack on the hitch. Normal hitches are mounted to the frame of the vehicle on the underside of the vehicle and normally at the back. For some vehicles, for example lightweight fender-less trailers, such an arrangement is impossible since there is no place to mount a regular hitch. In addition, when a towing vehicle, such as a car or a truck, is towing a trailer, the hitch of the towing vehicle is being used to tow the trailer and not to mount a bicycle rack. Therefore, there is a need to provide a means for mounting a bicycle rack in situations where normal hitches are inadequate.

Some attempts have been made in the art but have proven to be inadequate for one reason or another. The Pro Rac™ Tongue Mounted Bike Rack is useful for pop-up trailers but cannot accommodate non-pop-up trailers since the bicycles are carried above the trailer. United States Patent Publication 2004/0035998 published Feb. 26, 2004 describes a multipositionable apparatus for mounting a variety of accessories, but cannot function to both tow a trailer and mount a bicycle rack. U.S. Pat. Nos. 5,219,105, 6,644,525 and 6,695,184 all describe bicycle carriers that utilize normal hitches on towing vehicles thereby preventing the opportunity to also tow a trailer. U.S. Pat. No. 2,512,267 discloses a fender mounted bicycle rack, which would be useless on a fender-less trailer. U.S. Pat. No. 5,794,959 discloses a trailer hitch assembly for hauling a motorcycle which provides for a cradle to hold the front wheel of the motorcycle. In this case, the trailer itself must be specifically designed to haul the motorcycle, and not designed for another purpose.

SUMMARY OF THE INVENTION

There is provided a support for mounting a bicycle rack on a frame comprising: a cross-piece having a length to span first and second spaced-apart frame elements of the frame, the cross-piece forming a first angle with the first frame element and a second angle with the second frame element; first and second mounting brackets secured to the cross-piece for mounting the support on the first and second frame elements, the first mounting bracket forming an angle with the cross-piece which is congruent to the first angle, the second mounting bracket forming an angle with the cross-piece which is congruent to the second angle; and, mounting means secured to the cross-piece for mounting the bicycle rack on the cross-piece.

There is further provided a support for mounting a bicycle rack on an A-frame of a trailer tongue comprising: a cross-piece having a first end, a second end and an adjustable length to span first and second spaced-apart frame elements of the A-frame, the cross-piece forming a first angle with the first frame element and a second angle with the second frame element; first and second mounting brackets secured to the first and second ends of the cross-piece for mounting the support on the first and second frame elements, the first mounting bracket forming a first adjustable angle with the cross-piece, the first adjustable angle adjustable to be congruent to the first angle, the second mounting bracket forming a second adjustable angle with the cross-piece, the second adjustable angle adjustable to be congruent to the second angle; and, mounting means secured to the cross-piece for mounting the bicycle rack on the cross-piece.

There is yet further provided a system comprising: a trailer having a frame, the frame comprising first and second frame elements that form an A-frame tongue, the A-frame tongue having a vertex, a first side formed by the first frame element and a second side formed by the second frame element, the vertex having means for hitching the trailer to a towing vehicle; and, a bicycle rack support mounted on the tongue, the support comprising a cross-piece having a length that spans the tongue from the first side to the second side, the cross-piece forming a first angle with the first side and a second angle with the second side, first and second mounting brackets secured to the cross-piece for mounting the support on the first and second frame elements, the first mounting bracket forming an angle with the cross-piece which is congruent to the first angle, the second mounting bracket forming an angle with the cross-piece which is congruent to the second angle, and mounting means secured to the cross-piece for mounting a bicycle rack on the cross-piece.

There is still yet further provided a kit comprising: a support having a cross-piece having a length to span first and second spaced-apart frame elements of a frame, the cross-piece forming a first angle with the first frame element and a second angle with the second frame element, first and second mounting brackets secured or securable to the cross-piece for mounting the support on the first and second frame elements, the first mounting bracket forming an angle with the cross-piece which is congruent to the first angle, the second mounting bracket forming an angle with the cross-piece which congruent to the second angle, and mounting means secured or securable to the cross-piece for mounting a bicycle rack on the cross-piece; a bicycle rack having means for mounting the bicycle rack on the mounting means; and, instructions for assembling the support, mounting the support on the frame, mounting the bicycle rack on the support, or any combination thereof.

Supports of the present invention may be used to mount bicycle racks on most types of frames. The supports are particularly useful for mounting bicycles on fender-less trailers having an A-frame tongue, particularly lightweight fender-less trailers, for example Trail-lite™ trailers. Such trailers having enclosed propane tanks, i.e. tanks not mounted on the tongue, are of particular note. Fender-less trailers do not have any convenient location for mounting regular hitches, therefore carrying bicycles and/or bicycle racks on the trailer is problematic. However, since supports of the present invention can be mounted on the A-frame tongue between the trailer and the towing vehicle, bicycles and bicycle racks can be conveniently carried between the trailer and the towing vehicle.

The support comprises a cross-piece that spans frame elements of the frame. The cross-piece may be just long enough to span the frame elements at a desired location on the frame, or it may be longer so that it overhangs the frame elements at one or both ends of the cross-piece. The cross-piece overhangs the frame elements by only a small amount so that the cross-piece can rest on the frame elements without protruding too far beyond. The cross-piece forms angles with the frame elements where they intersect. The angles depend on the type of frame and the direction in which the cross-piece spans the frame elements.

For an A-frame in which two frame elements meet at a vertex, the cross-piece preferably spans the frame elements to form an isosceles or equilateral triangle bounded by the cross-piece and the two frame elements. In such a case, the angles formed at the points where the cross-piece intersects the frame elements depends on the angle at the vertex where the frame elements meet.

The cross-piece may be any suitable shape. For example, it may be a tube (preferably a rectangular tube), an angle iron, a flat strip, etc. Rectangular tubes are preferred for their strength and rigidity. Angle irons may require a reinforcement plate to achieve desired rigidity. Flat strips may not be rigid enough for some applications, particularly where a number of bicycles are to be carried on the bicycle rack.

The cross-piece may have a fixed length or it may have an adjustable length. An adjustable length cross-piece contributes to a "one size fits all" concept as a single support could then be used, for example, with a variety of different frames having different spacing of frame elements, or at a variety of locations along an A-frame. The length may be infinitely or discretely adjustable. Adjustability may be achieved by any suitable means; for example, a cross-piece may have one or more sliding pieces (e.g. telescoping tubes), the cross-piece may have movable or removable interconnecting segments, etc. Adjustable cross-pieces may further comprise means for securing adjustable elements once a desired length is set.

Mounting brackets are secured to the cross-piece and permit mounting of the support onto the frame elements of the frame. Mounting brackets may be secured to the cross-piece at any convenient location on the cross-piece and by any suitable means. Securement may be achieved, for example, by welding, by bolts, by pins, by interlocking elements, etc. Mounting brackets are secured on the cross-piece so that when the cross-piece spans the frame elements, the mounting brackets abut the outsides of the frame elements thereby "bracketing" the frame elements and preventing the support from moving in a direction parallel to the length of the cross-piece. Mounting brackets are preferably substantially flat plates defining vertical planes, wherein at least a portion of each bracket extends below the cross-piece and the portion of each bracket extending below the cross-piece abuts the outside of the frame elements. Mounting brackets may be secured inward from the ends of the cross-piece, however, they are preferably secured near the ends of the cross-piece so that the cross-piece spans the frame elements without protruding very far beyond.

Mounting brackets are secured to the cross-piece so that they form angles with the cross-piece that are congruent to the angles formed at the intersection of the cross-piece and the frame elements. In this manner, contact is increased between the surfaces of the mounting brackets and the outside of the frame elements, which provides for better and more secure mounting of the support on the frame. The angles formed between the cross-piece and mounting brackets are preferably not 90-degrees, and more preferably between 20-degrees and 75-degrees as most A-frame tongues on trailers have a vertex angle between 20-degrees and 120-degrees.

The angle or angles formed between one or more of the mounting brackets and the cross-piece may be fixed or adjustable. Adjustability contributes to a "one size fits all" concept as a single support could then be used, for example, with a variety of different frames having frame elements at different angles. Since A-frame tongues of different styles of trailers have different vertex angles, a single support with adjustable mounting bracket angles could be used or sold with any style of trailer. The angle or angles may be infinitely or discretely adjustable. Adjustable angle mounting brackets may be achieved by any suitable means, for example, by securing the mounting brackets to the cross-piece with pins on which the brackets may pivot in relation to the cross-piece.

The combination of an adjustable length cross-piece and adjustable angle mounting brackets provides a very versatile support that can be mounted on a large variety of frames.

The support comprises a mounting means secured to the cross-piece for mounting the bicycle rack on the cross-piece. Any suitable mounting means may be used. The mounting means is preferably a receiver tube for receiving a mounting element of the bicycle rack. The receiver tube may have a pocket of any shape. Since mounting elements of bicycle racks usually comprise square or round posts, the pocket of the receiver tube is preferably square or round, more preferably square. The mounting element of most commonly made bicycle racks are equipped with holes through which a pin may be placed to hold the mounting element in a standard hitch. Similarly, the mounting element of the bicycle rack may be secured in the pocket of the receiver tube by a pin placed through aligned holes in the mounting element and the receiver tube. However, other means for securing the mounting element in the receiver tube may be used, for example, set screws, bolts, etc.

The mounting means may be secured to the cross-piece by any suitable means, for example, by welding, by bolts, by pins, etc. If desired, rigidity of the mounting means may be increased by securing a gusset to the mounting means and the cross-piece.

Orientation of the mounting means is determined by the type of bicycle rack being mounted on the support. Some bicycle racks require that the mounting means be oriented generally upwardly, while others require that the mounting means be oriented generally horizontally. In one embodiment, the mounting means may be fixedly secured to the cross-piece in an upwardly pointing position. In another embodiment, the mounting means may be fixedly secured to the cross-piece in a horizontally pointing position. In yet another embodiment, for greater versatility, the mounting means may be adapted to be oriented either upwardly or horizontally. This adaptation may be achieved by having a single mounting means pivotable between an upwardly pointing position and a horizontally pointing position. Another way of achieving the adaptation is to have two mounting means fixedly secured to the cross-piece, one in an upwardly pointing position and the other in a horizontally pointing position. Although most bicycle racks require the mounting means, for example a receiver tube, to be oriented either upwardly or horizontally, other orientations are possible.

The combination of an adjustable length cross-piece, adjustable angle mounting brackets and different orientations of bicycle rack mounting means provides a very versatile support that can be mounted on a large variety of frames and used with a number of types of bicycle racks.

The support may be secured to the frame elements by any suitable means, for example, bolts (e.g. U-bolts), clamps, etc. Any convenient part of the support may be secured to the frame elements, for example the cross-piece or the mounting brackets. Preferably, the mounting brackets are secured to the frame elements. Mounting brackets may further comprise means for further securing the mounting brackets to the underside of the frame elements. For example, the mounting brackets may further comprise a lip or lips for abutment with the underside of the frame elements. The lip is preferably an integrally formed part of the mounting bracket. Mounting brackets may also be adapted to accommodate frame elements of different sizes to provide additional versatility to the support.

The support may be made from any suitable material or combination of materials, for example, metal (e.g. steel, stainless steel, aluminum alloy, magnesium alloy, etc.) or rigid plastic (e.g. polycarbonate, polycarbonate hybrid, acrylic, ABS, etc.).

A system of the present invention comprises a trailer having a frame and a bicycle rack support as described above mounted on the frame, particularly on the tongue of the trailer. The frame of the trailer comprises frame elements that form an A-frame tongue having a vertex where the frame elements intersect. The cross-piece of the support spans the frame elements, and the mounting brackets abut the outside of the frame elements thereby bracketing the frame elements. Frame elements are preferably square or rectangular for improved engagement with the mounting brackets.

In mounting the support, it may be convenient to initially place the support on a narrower part of the tongue to provide clearance for the brackets and then slide the support into place thereby engaging the brackets against the outside of the frame elements. This technique is especially useful when the brackets comprise lips for abutment against the underside of the frame elements since the lips depend inwardly from the mounting brackets. In the case where the mounting bracket angle is adjustable, the proper angle for the particular tongue may be set before sliding the support into place, or the angle may be set automatically as the support is slid into place.

The location of the support on the tongue depends on the type of bicycle rack to be used. The support should be placed to provide enough clearance between the bicycles and the trailer and between the bicycles and the towing vehicle. The ideal location can be readily determined by simple experimentation. Determination of the proper location on the tongue determines the length of cross-piece. Therefore, the length of the cross-piece also depends on the type of bicycle rack to be used. The system can accommodate any number of bicycles for which there is space between the trailer and the towing vehicle. Preferably up to four bicycles can be accomodated.

A correlation between the kind of trailer, the type of bicycle rack, the mounting bracket angle and the length of the cross-piece can be readily made. Thus, kits may be provided that provide the necessary components for carrying bicycles on a variety of kinds of trailers. This greatly simplifies the purchase of bicycle racks and supports for the various kinds of trailers being used. A kit comprises a bicycle rack support of the present invention, or components of the support, and a bicycle rack together with instructions for assembling the support, mounting the support on the trailer frame and/or mounting the bicycle rack on the support.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Referring to FIGS. 1-13, one embodiment of a bicycle rack support of the present invention is depicted. The support comprises crossbar 10 having outer rectangular tube 11 and first and second inner rectangular tubes 12,13 slidably engaged within the outer tube. The length of crossbar 10 may be adjusted by sliding one or both of innertubes 12,13 within outer tube 11. Inner tubes 12,13 are prevented from sliding completely out of outer tube 11 by first and second bolts 16,17, which pass through first and second slots 14,15 in the outer tube and through holes (not shown) in the respective inner tubes. The lengths of the slots 14,15 impose a maximum and minimum length on crossbar 10, since the ends of the slots act as end stops for the bolts 16,17. Tightening of the bolts 16,17, while not necessary, helps prevent changes in the length of crossbar 10 once the desired length is determined and set.

Figure 12:
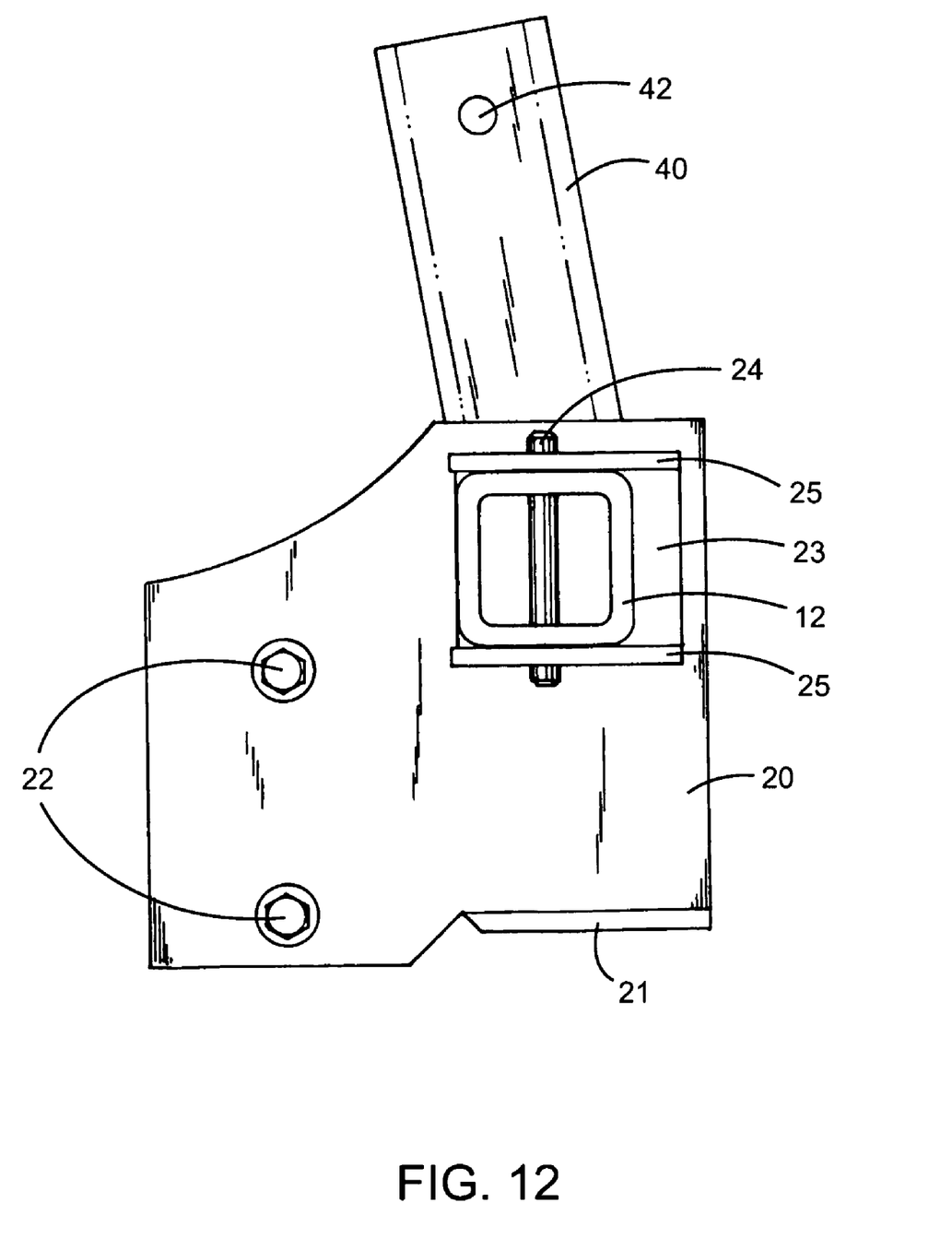
FIG. 12 is a side view of one of the mounting brackets shown in FIG. 1.

First inner tube 12 is pivotally connected to first mounting bracket 20 to provide adjustability of the angle formed between crossbar 10 and the first mounting bracket. First mounting bracket 20 comprises a first opening 23 (as best seen in FIG. 12) through which first inner tube 12 passes to protrude slightly beyond the mounting bracket. At the upper and lower edges of first opening 23, the first mounting bracket comprises outwardly protruding first pin flanges 25. First pin 24 passes through aligned holes (not shown) in first pin flanges 25 and first inner tube 12 to pivotally secure crossbar 10 to first mounting bracket 20.

First mounting bracket 20 further comprises first U-bolt 22, which, in operation, wraps around a frame element of a frame to mount the support on the frame. Nuts and lock washers are used to secure first U-bolt 22. First mounting bracket 20 also comprises inwardly protruding first lip 21 located at the bottom of the first mounting bracket. In operation, the frame element of the frame rests on the first lip to provide additional security against the support slipping off the frame element.

Figure 1:
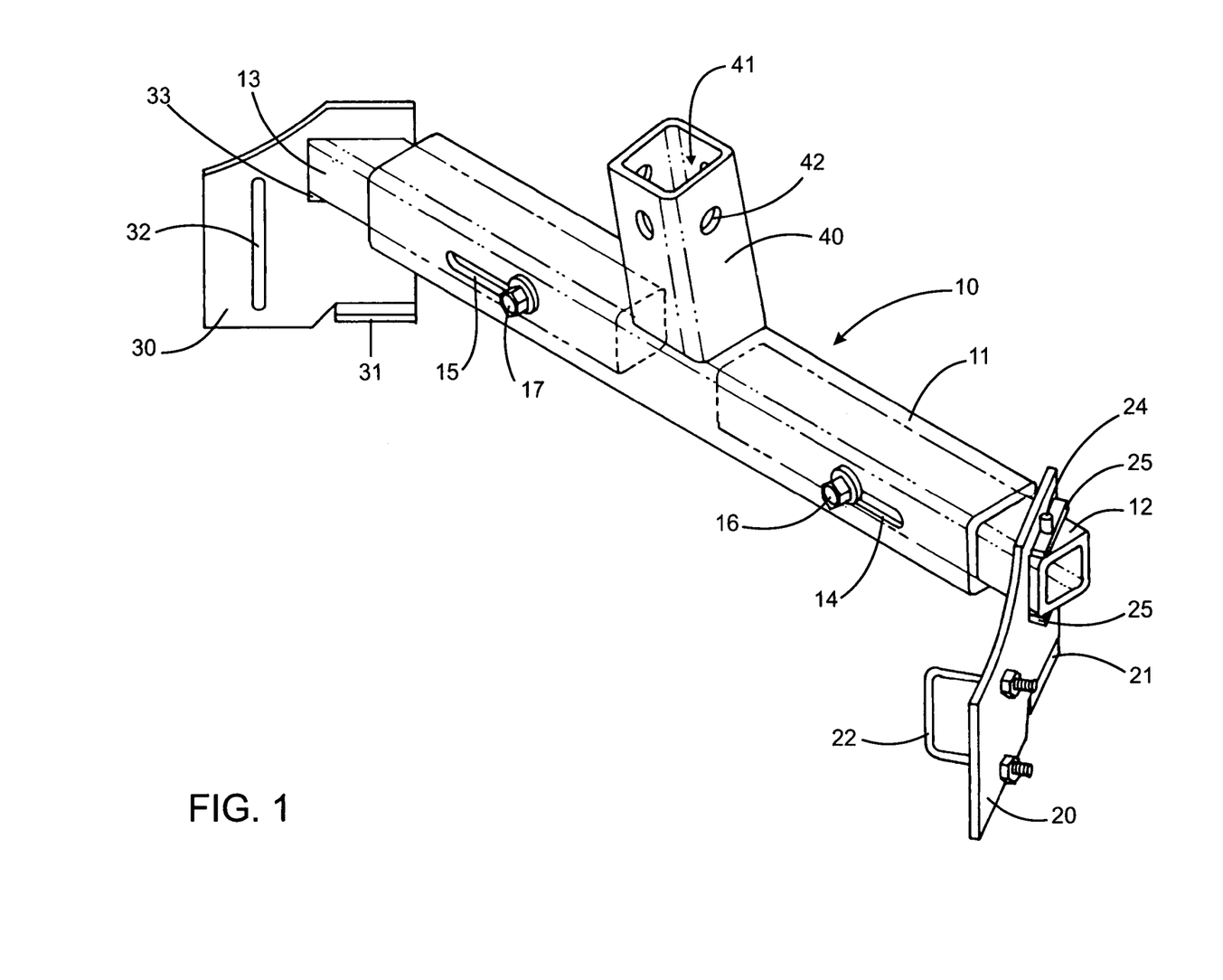
FIG. 1 is a perspective view of an adjustable bicycle rack support of the present invention having a fully retracted adjustable crossbar and mounting brackets forming angles of greater than 90-degrees with the crossbar.

Second inner tube 13 is pivotally connected to second mounting bracket 30 to provide adjustability of the angle formed between crossbar 10 and the second mounting bracket. Second mounting bracket 30 comprises a first opening 33 (as best seen in FIG. 1) through which second inner tube 13 passes to protrude slightly beyond the mounting bracket. At the upper and lower edges of second opening 33, the second mounting bracket comprises outwardly protruding second pin flanges 35. Second pin 34 passes through aligned holes (not shown) in second pin flanges 35 and second inner tube 13 to pivotally secure crossbar 10 to second mounting bracket 30.

Second mounting bracket 30 further comprises second U-bolt 32, which, in operation, works in a similar manner as the first U-bolt described above. Nuts and lock washers are used to secure second U-bolt 32. Second mounting bracket 30 also comprises inwardly protruding second lip 31 located at the bottom of the second mounting bracket. In operation, the second lip 31 operates in a similar manner as the first lip described above.

Square receiver tube 40 is welded to outer tube 11 of crossbar 10 so that square pocket 41 points generally upwardly. In operation, receiver tube 40 receives a mounting post of a bicycle rack and the mounting post is secured in the receiver tube by a pin inserted through aligned holes in the receiver tube and mounting post. Holes 42 in all four sides of square receiver tube 40 permit insertion of a pin from any of four directions.

Figure 13:
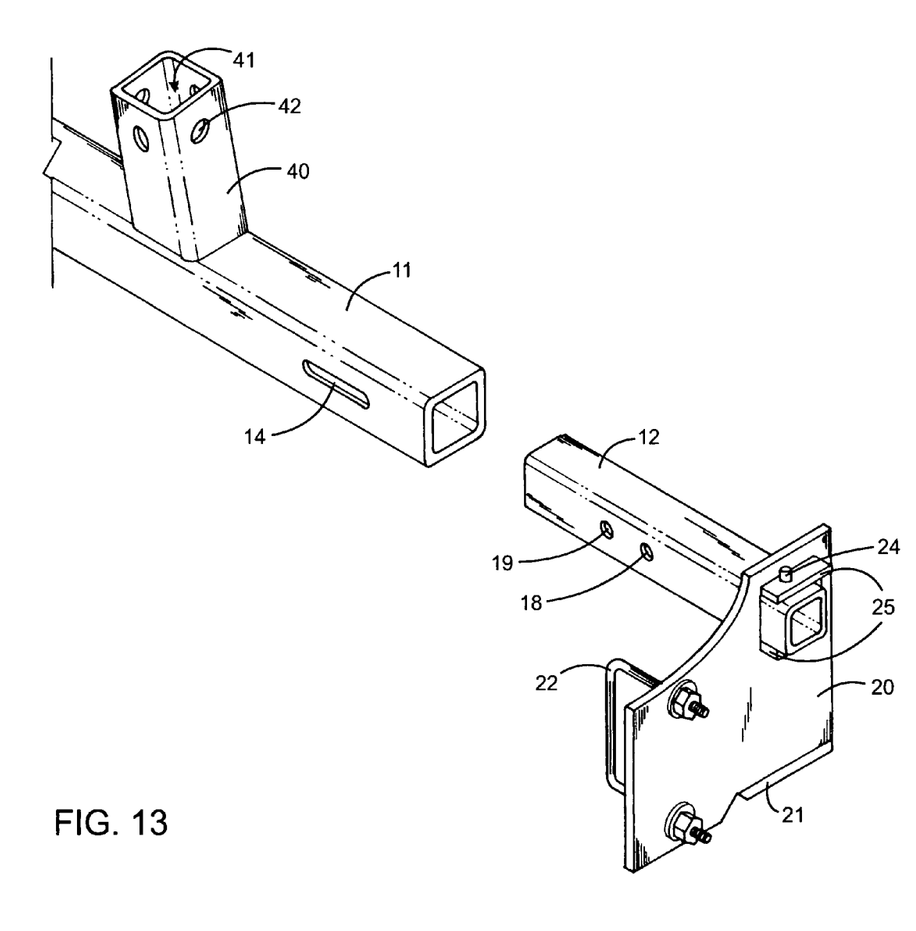
FIG. 13 is an exploded view of part of the adjustable crossbar shown in FIG. 1.

Referring specifically to FIG. 13, an exploded view of part of crossbar 10 shows that first inner tube 12 has a pair of holes 18,19. There is an aligned pair of counterpart holes (not shown) on the opposite face of the first inner tube across from the pair of holes 18,19. One of the holes of the pair and its counterpart hole on the opposite face receive the first bolt (not shown in FIG. 13), which is inserted through first slot 14 in outer tube 11 and protrudes from the opposite face of outer tube 11 through a counterpart slot (not shown). Use of distal hole 18 to receive the first bolt provides for smaller maximum and minimum lengths of crossbar 10, while use of proximal hole 19 provides for larger maximum and minimum lengths of crossbar 10. The second inner tube has a similar arrangement of holes. While a pair of holes is depicted, it is evident that an arrangement of any number of holes is possible, including no holes since there is no requirement to secure the inner tubes to the outer tube.

Figure 2:
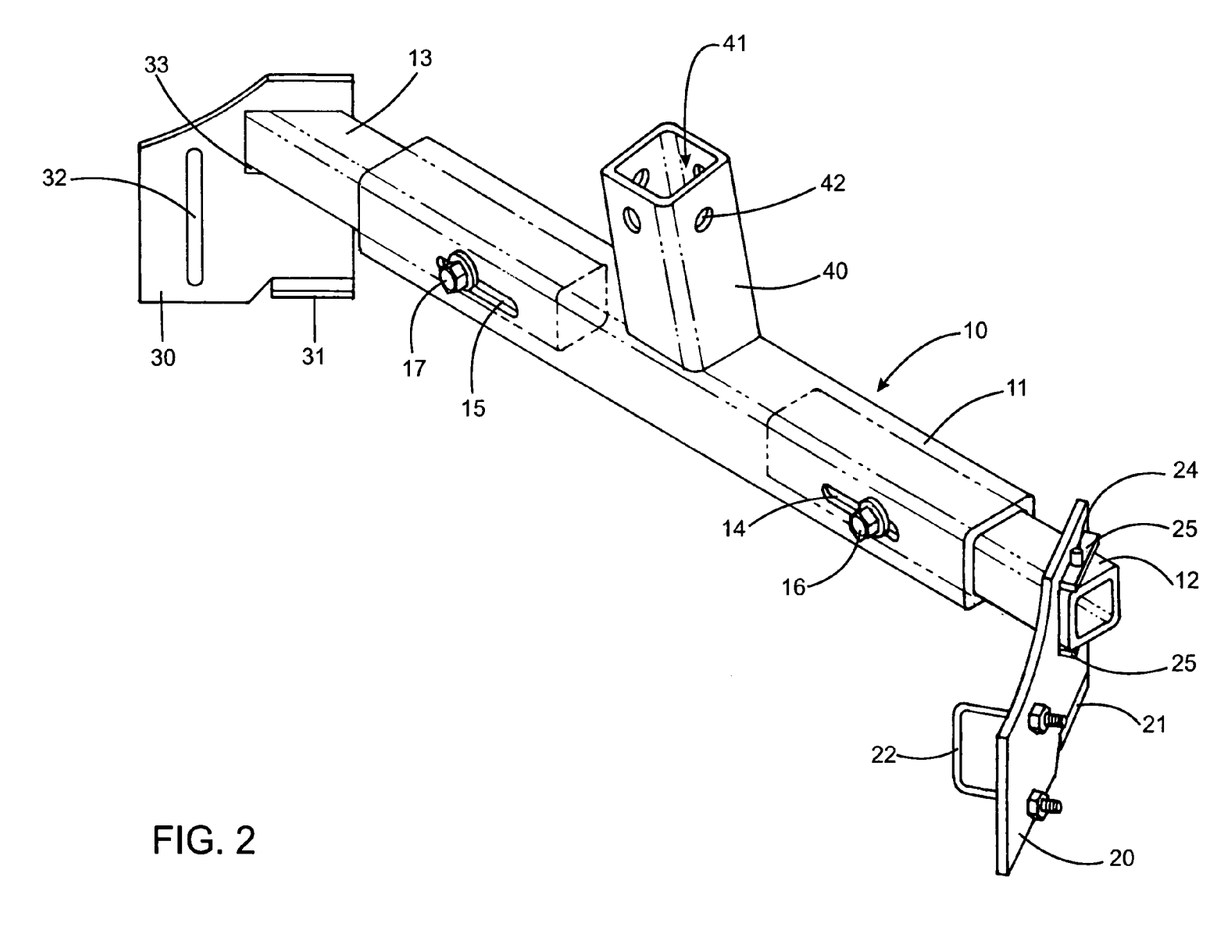
FIG. 2 depicts the bicycle rack support of FIG. 1 in which the adjustable crossbar is extended.

Referring specifically to FIGS. 1 and 2, adjustability of the length of crossbar 10 is evident by comparing FIG. 1 to FIG. 2. In FIG. 1, the inner tubes 12,13 are fully retracted as bolts 16,17 are stopped against the inner ends of slots 14,15. The length of crossbar 10 can be made longer by sliding the inner tubes 12,13 outwardly to an extended position as shown in FIG. 2. It is evident that in an embodiment in which the bolts 16,17 are not present, the inner tubes can slide inwardly until stopped by the mounting brackets 20,30, and can slide outwardly until they slide out of outer tube 11. The main function of bolts 16,17 is to prevent the inner tubes from sliding out of the outer tube when the support is not mounted on a frame. When the support is mounted on a frame, U-bolts 22,32 are mainly responsible for securement while bolts 16,17, lips 21,31 and crossbar 10 itself provide supplemental securement of the support to the frame.

Figure 11:
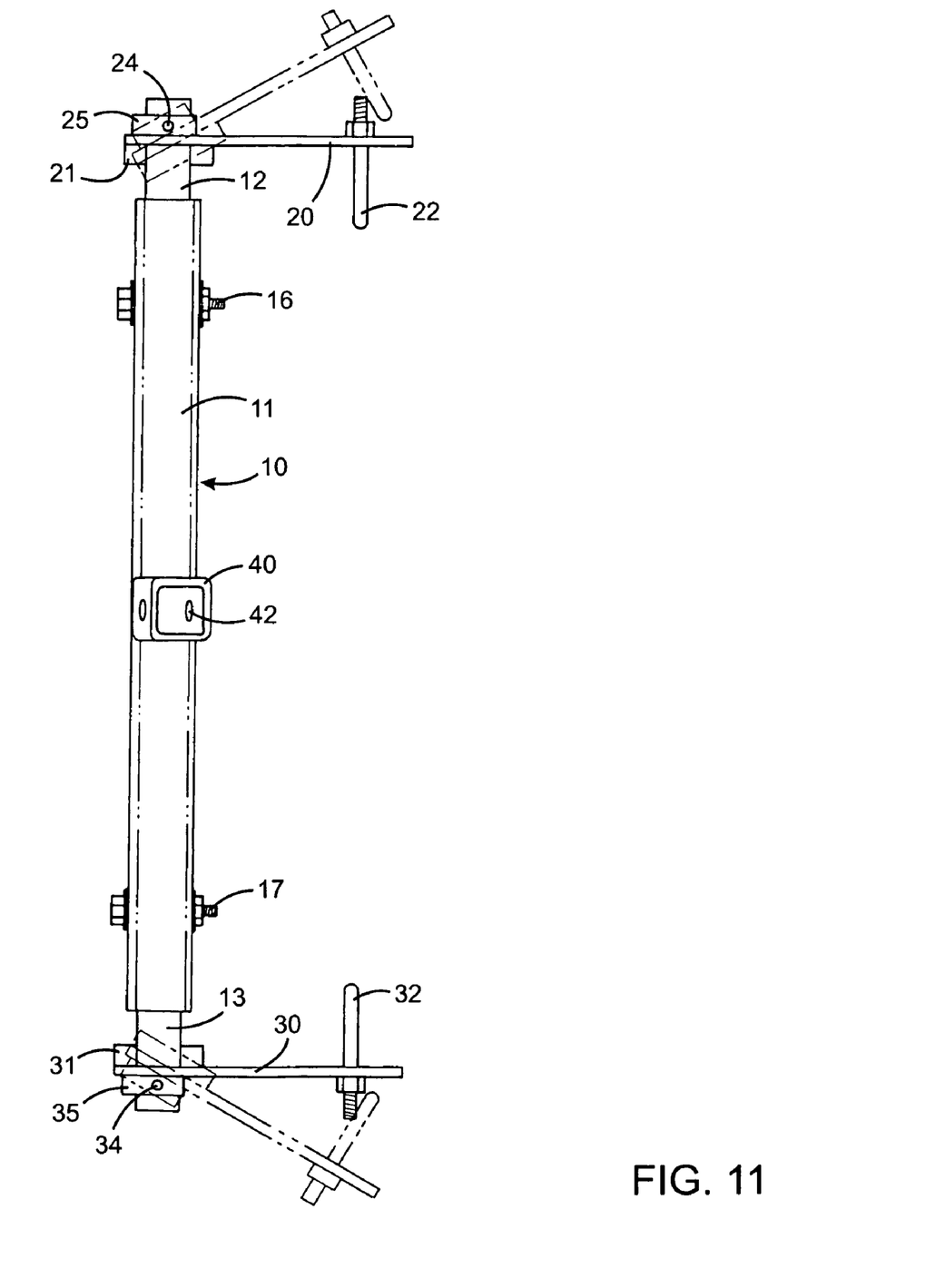
FIG. 11 is a top view of the bicycle rack support of FIG. 1 showing how the mounting brackets pivot in relation to the crossbar.

Referring specifically to FIGS. 3-10 and 11, adjustability of the angles formed between crossbar 10 and mounting brackets 20,30 is evident. FIGS. 3-6 and the broken lines in FIG. 11 show the mounting brackets in a fully angled position. FIGS. 7-10 and the solid lines in FIG. 11 show the mounting brackets at right angles to the crossbar. The mounting brackets may, independent of one another, form any angle with the crossbar between the right angle depicted in FIGS. 7-10 and a maximum angle as depicted in FIGS. 3-6. Angle change is accomplished by pivoting of mounting brackets 20,30 on pins 24,34, respectively. Thus, the support can accommodate a rectangular frame, or any A-frame up to a certain maximum angle. The maximum angle is determined by the diameter of the inner tubes and the size of the openings in the mounting brackets through which the inner tubes protrude.

Figure 3:
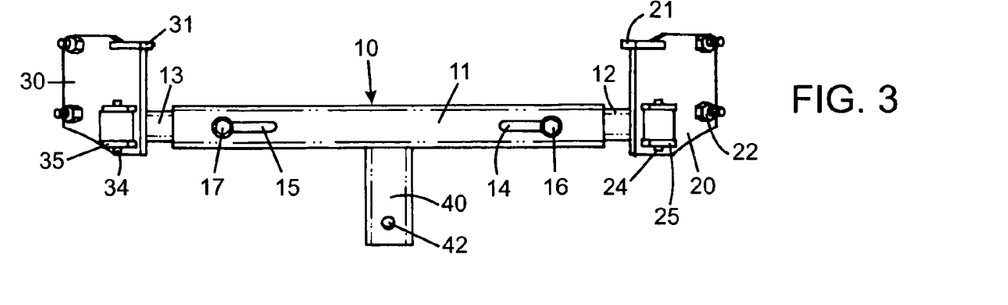
FIG. 3 is a front orthographic view of the bicycle rack support of FIG. 2.
Figure 4:
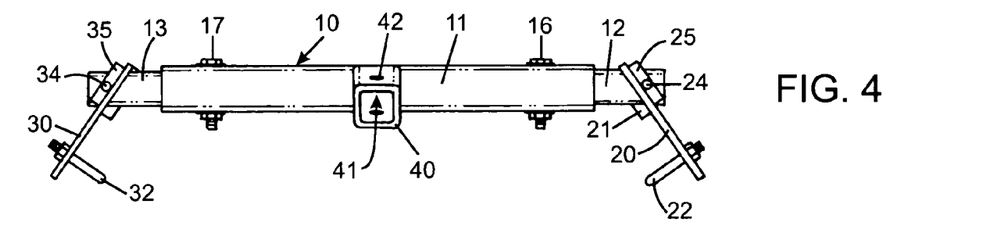
FIG. 4 is a top orthographic view of the bicycle rack support of FIG. 2.
Figure 7:
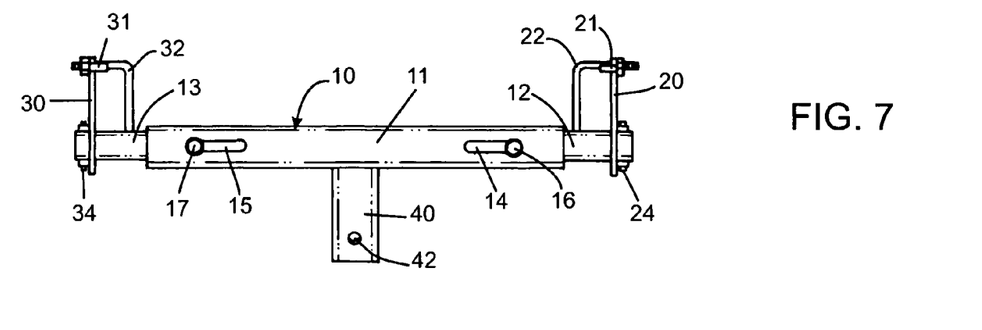
FIG. 7 depicts the bicycle rack support of FIG. 3 in which the mounting brackets form angles of 90-degrees with the crossbar.
Figure 8:
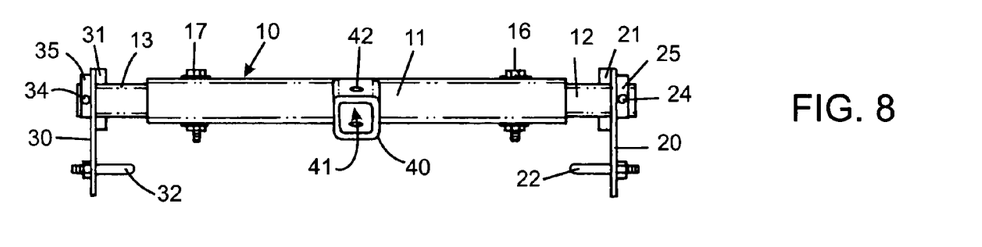
FIG. 8 depicts the bicycle rack support of FIG. 4 in which the mounting brackets form angles of 90-degrees with the crossbar.

When mounted on an A-frame, and considering the vertex of the A-frame to be at the front, the support is mounted on the A-frame such that the mounting brackets 20,30 point rearwardly away from crossbar 10. Thus, FIGS. 3 and 7 are front, upside down views, while FIGS. 5 and 9 are rear, upside up views.

Figure 5:
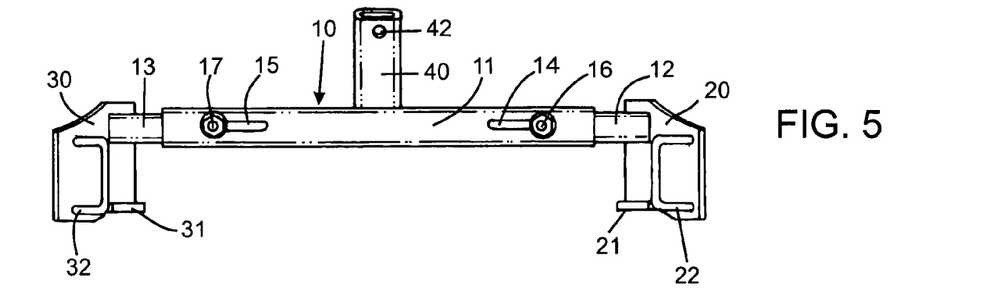
FIG. 5 is a rear orthographic view of the bicycle rack support of FIG. 2.
Figure 6:
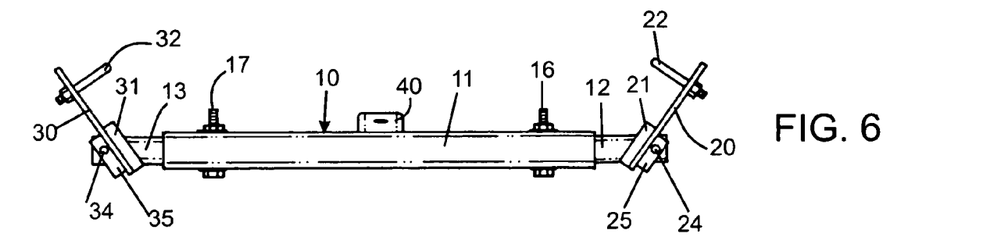
FIG. 6 is a bottom orthographic view of the bicycle rack support of FIG. 2.
Figure 9:
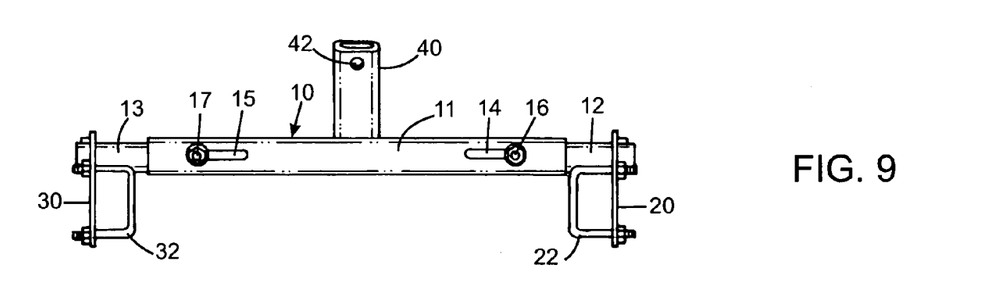
FIG. 9 depicts the bicycle rack support of FIG. 5 in which the mounting brackets form angles of 90-degrees with the crossbar.
Figure 10:
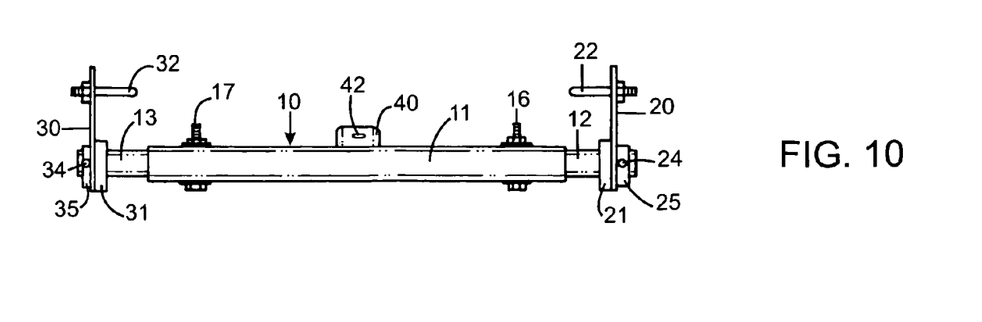
FIG. 10 depicts the bicycle rack support of FIG. 6 in which the mounting brackets form angles of 90-degrees with the crossbar.

Referring specifically to FIGS. 5 and 9, the spatial relationship between crossbar 10, lips 21,31 and U-bolts 22,32 is most clearly seen. There is a gap between the crossbar and the lips having a distance from the crossbar to the lip set to match the standard diameter of the frame elements to which the support is to be mounted. In this way, a frame element is engaged between an upper surface (the crossbar) and a lower surface (the lip) with as little play as can be practically achieved. This arrangement reduces the opportunity for the support to rattle when mounted. The U-bolts each bound an area approximately the same size and shape as the frame element, therefore, when the nuts of the U-bolts are tightened, the frame elements are snugly and securely held by the U-bolts. It can also be seen that the position of the U-bolts on the mounting bracket is approximately in alignment with the gap between the crossbar and the lips since the frame elements must pass through both the U-bolts and the gaps. It is understood that tolerances need not be too tight since the U-bolts alone securely mount the support to the frame elements.

Figure 14:
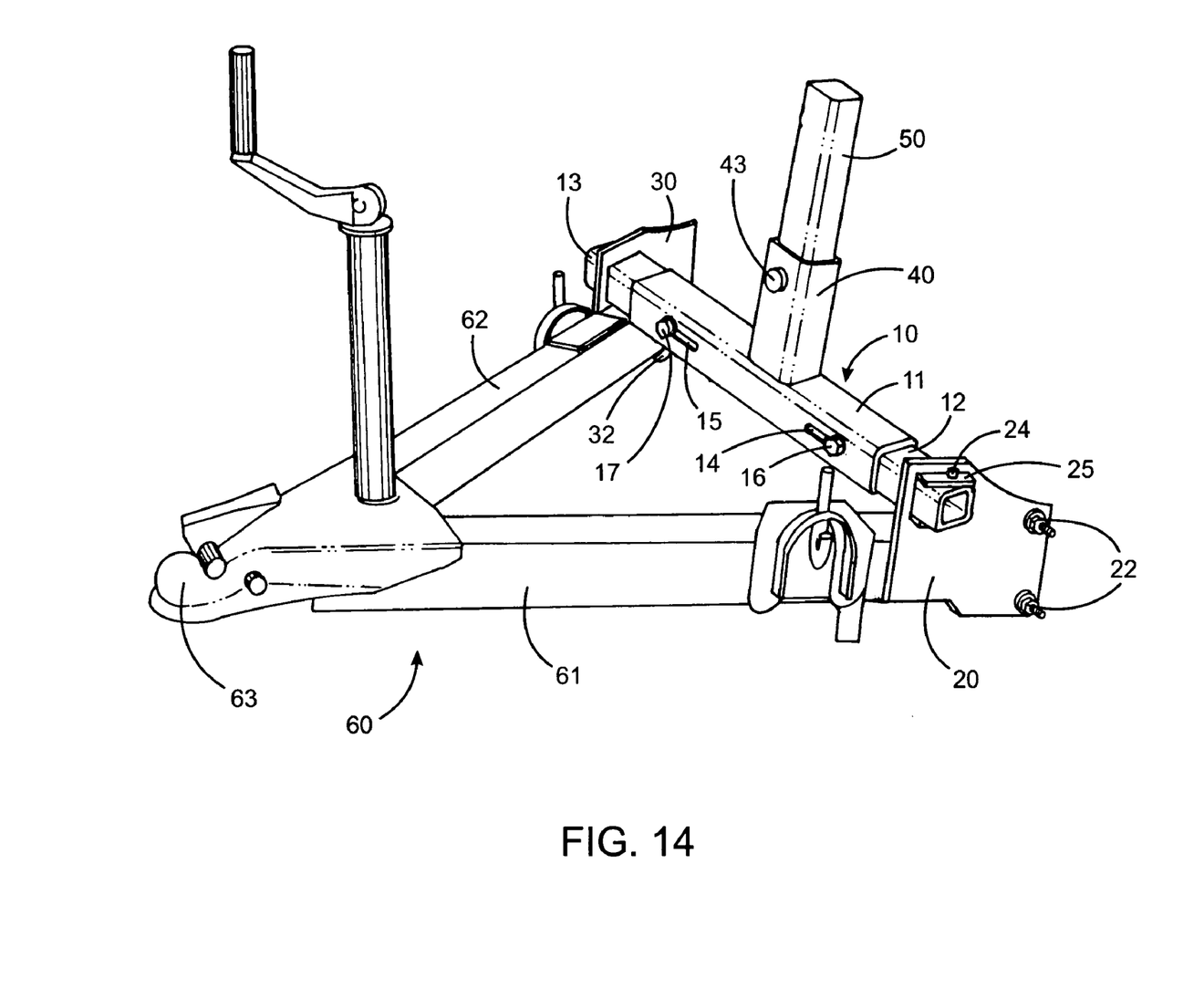
FIG. 14 is a perspective view of a bicycle rack support of the present invention mounted on an A-frame tongue of a trailer.
Figure 15:
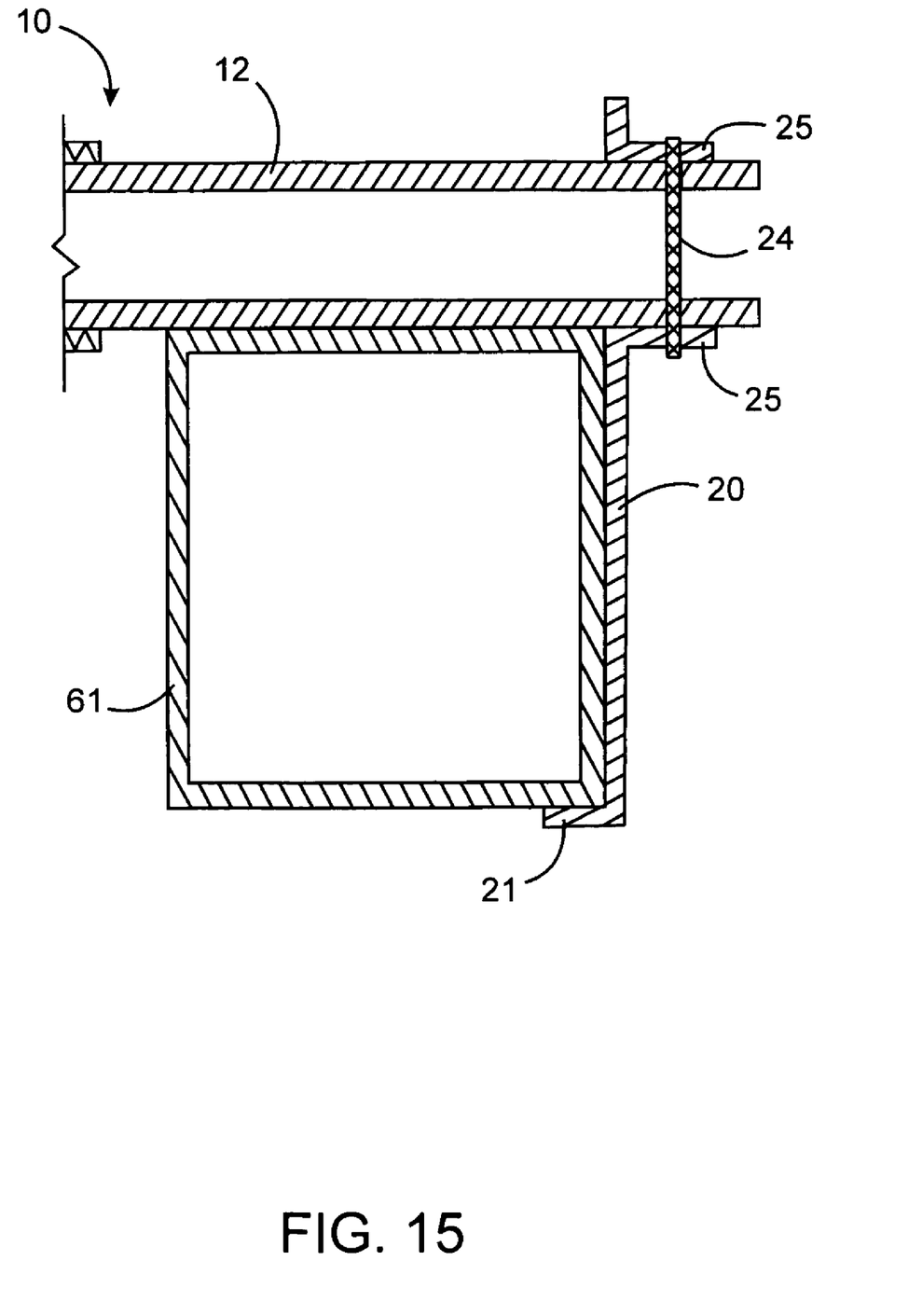
FIG. 15 is a front cross-sectional view of a mounting bracket of the bicycle rack support shown in FIG. 14 mounted to a frame element of the tongue of the trailer.

Referring now to FIGS. 14 and 15, a bicycle rack support of the present invention is mounted on an A-frame tongue of a fender-less trailer. Crossbar 10 of the support spans first and second spaced-apart rectangular frame tubes 61,62 of trailer tongue 60. The frame tubes 61,62 meet at a vertex at which there is a hitch 63 for attachment to a towing vehicle. Inner tubes 12,13 of the support are set at positions within outer tube 11 so that mounting brackets 20,30 engage the outside of frame tubes 61,62 respectively. Bolts 16,17 through slots 17,18 in outer tube 11 may be tightened to provide further securement, however, securement of frame tubes 61,62 within U-bolts 22,32 is sufficient to prevent the inner tubes from sliding in or out. To maximize contact between the mounting brackets and the frame tubes, the angle formed by the mounting brackets and the crossbar is set to complement the angle formed between the crossbar and the frame tubes. The angle is set by pivoting the mounting brackets on their respective pins. First pin 24 and first pin flanges 25 are shown on first mounting bracket 20, while the second pin and the second pin flanges are hidden behind second mounting bracket 30.

Still referring to FIG. 14, receiver tube 40 points in a generally upward direction and receives mounting post 50 of a bicycle rack. Mounting post 50 is secured in receiver tube 40 by a pin 43 inserted through aligned holes in the receiver tube and mounting post.

Referring specifically to FIG. 15, a front cross-sectional view taken through the middle of first pin 24 of first mounting bracket 20 is depicted. First mounting bracket 20 is mounted to crossbar 10 by first inner tube 12 protruding through an opening in the first mounting bracket and pivotally secured by first pin 24 inserted through holes in first pin flanges 25 and the first inner tube. First frame tube 61 is engaged between the underside of first inner tube 12 and the upper surface of first lip 21. A similar arrangement is provided at the second mounting bracket.

Figure 16:
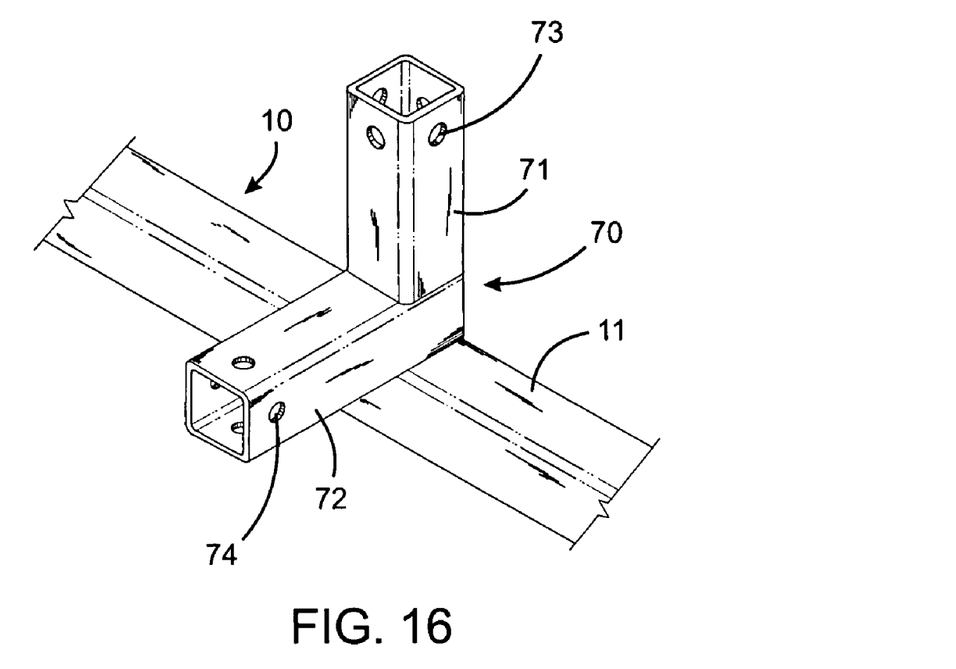
FIG. 16 is a perspective view of an alternate embodiment of a receiver tube arrangement on a bicycle rack support of the present invention; and, FIG. 17 is a side view of an alternate embodiment of a mounting bracket of the present invention.

Referring to FIG. 16, an alternate embodiment of a receiver tube is depicted in which receiver tube 70 comprises upright square tube 71 welded on top of horizontal square tube 72. Horizontal square tube 72 of receiver tube 70 is welded to outer tube 11 of crossbar 10. Upright square tube 71 comprises holes 73 for receiving pins to secure a mounting post (not shown) of a bicycle rack. Horizontal square tube 72 comprises holes 74 for receiving pins to secure a mounting post (not shown) of a bicycle rack. Such an alternate embodiment is capable of accommodating bicycle racks having a vertical mounting post or a bicycle racks having a horizontal mounting post, both of which are common in the art.

Figure 17:
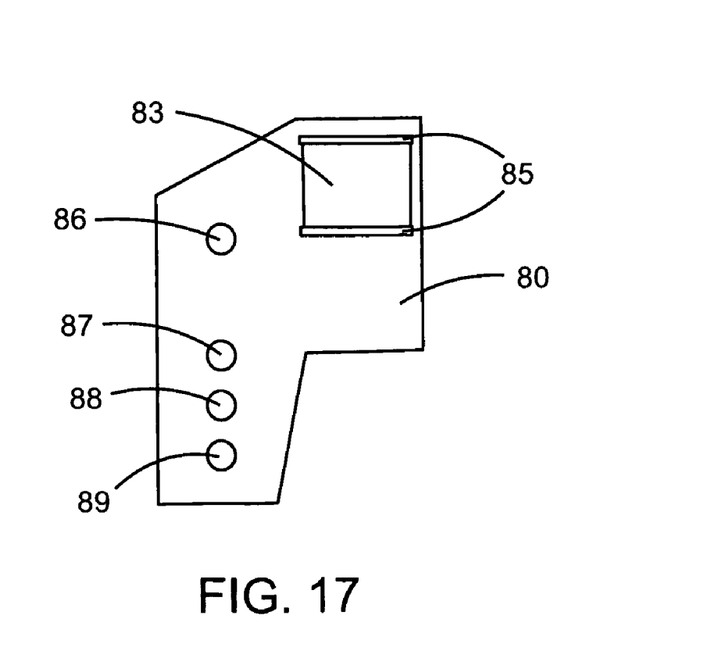

Referring to FIG. 17, an alternate embodiment of a mounting bracket is depicted, which can accommodate 4-inch, 5-inch and 6-inch frame elements. Mounting bracket 80 comprises an opening 83 and pin flanges 85, which function in a manner similar to that of FIG. 12. Common U-bolt hole 86 receives one end of a U-bolt irrespective of the size of the frame element and U-bolt used. If the frame element is 4 inches, a 4-inch U-bolt is used and the other end of the U-bolt is received by 4-inch U-bolt hole 87. If the frame element is 5 inches, a 5-inch U-bolt is used and the other end of the U-bolt is received by 5-inch U-bolt hole 88. If the frame element is 6 inches, a 6-inch U-bolt is used and the other end of the U-bolt is received by 6-inch U-bolt hole 89. In this embodiment, no lip is provided on the bottom of the mounting bracket since the bracket must accommodate several sizes of frame elements.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A system comprising:
a trailer having a frame, the frame comprising first and second frame elements that form an A-frame tongue, the A-frame tongue having a vertex, a first side formed by the first frame element and a second side formed by the second frame element, the vertex having means for hitching the trailer to a towing vehicle; a bicycle rack having a mounting post;
a bicycle rack support mounted on the tongue, the support comprising:
a cross-piece having a length that spans the tongue from the first side to the second side, the cross-piece forming a first angle with the first side and a second angle with the second side,
first and second mounting brackets secured to the cross-piece for mounting the support on the first and second frame elements, the first mounting bracket forming an angle with the cross-piece which is congruent to the first angle, the second mounting bracket forming an angle with the cross-piece which is congruent to the second angle, and
a tube secured to the cross-piece and receiving the mounting post; and a pin, securing the mounting post in the tube.

2. An improvement in an A-frame tongue of a trailer, the A-frame tongue having a hitch for attachment to a towing vehicle and first and second frame elements that originate at the hitch at a fixed angular relationship, the improvement comprising a bicycle rack having a mounting post;
a cross-piece that spans the respective frame elements, the cross-piece forming a first angle with the first frame element and a second angle with the second frame element;
first and second mounting brackets secured to the cross-piece for mounting the cross-piece on the respective frame elements, the first mounting bracket forming an angle with the cross-piece that is congruent to the first angle and the second mounting bracket forming an angle with the cross-piece that is congruent to the second angle; and
a tube, secured to the cross-piece and receiving the mounting post; and a pin securing the mounting post in the tube.

* * * * *

UNITED STATES PATENT AND TRADEMARK OFFICE
CERTIFICATE OF CORRECTION

| | | |
|---|---|---|
| PATENT NO. | : 7,621,493 B2 | Page 1 of 1 |
| APPLICATION NO. | : 11/042141 | |
| DATED | : November 24, 2009 | |
| INVENTOR(S) | : Vermette et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Twenty-sixth Day of October, 2010

David J. Kappos
*Director of the United States Patent and Trademark Office*